(12) United States Patent
Hartwich

(10) Patent No.: US 7,096,295 B2
(45) Date of Patent: Aug. 22, 2006

(54) METHOD AND DEVICE FOR GENERATING PROGRAM INTERRUPTIONS IN USERS OF A BUS SYSTEM, AND BUS SYSTEM

(75) Inventor: Florian Hartwich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/489,551

(22) PCT Filed: Sep. 12, 2002

(86) PCT No.: PCT/DE02/03398

§ 371 (c)(1),
(2), (4) Date: Sep. 13, 2004

(87) PCT Pub. No.: WO03/025686

PCT Pub. Date: Mar. 27, 2003

(65) Prior Publication Data

US 2005/0015521 A1      Jan. 20, 2005

(30) Foreign Application Priority Data

Sep. 13, 2001   (DE) ................................ 101 45 219

(51) Int. Cl.
G06F 13/24      (2006.01)
H04L 29/06      (2006.01)
(52) U.S. Cl. .................. 710/260; 710/266; 361/683
(58) Field of Classification Search ........ 710/260–266, 710/48, 100; 712/244; 370/540; 713/502; 361/683
See application file for complete search history.

(56) References Cited

U.S. PATENT DOCUMENTS 5,274,826 A * 12/1993 Kardach et al. ............ 710/260
5,687,381 A * 11/1997 Swanstrom et al. ........ 710/269
5,881,295 A *  3/1999 Iwata ......................... 710/262
6,141,700 A * 10/2000 Iwata ........................... 710/3

FOREIGN PATENT DOCUMENTS

| DE | 100 00 302 | 7/2001 |
| DE | 100 00 303 | 7/2001 |
| DE | 100 00 304 | 7/2001 |
| DE | 100 00 305 | 7/2001 |
| EP | 0 886 412 | 12/1998 |
| WO | 00 44194 | 7/2000 |
| WO | 01 59965 | 8/2001 |

OTHER PUBLICATIONS

"A general purpose real time digital speech processor" by Mohiuddin et al. (abstract only)☐☐Publication Date: Apr. 1981.*
Lonn H. et al., "Synchronisation in safety-critical distributed control systems", Algorithms and Architectures for Parallel Processing, 1995, ICAPP 95, IEEE First ICAPP, IEEE First International Conference on Brisbane, Qld., Australia, Apr. 19-21, 1995, New York, NY, pp. 891-899.
Rostamzadeh B. et al., "Dacapo: a distributed computer architecture for safety-critical control applications", Intelligent Vehicles '95 Symposium, Proceedings of the Detroit, MI, USA Sep. 25-26, 1995, New York, NY, pp. 376-381.

* cited by examiner

*Primary Examiner*—Gopal C. Ray
(74) *Attorney, Agent, or Firm*—Kenyon & Kenyon LLP

(57) ABSTRACT

A method and device and a bus system for generating at least one program interruption in at least one user of a bus system, at least one user storing a specifiable time value in at least one memory and the time value being compared with at least one base time, the at least one program interruption being triggered when the time value is equal to the base time.

14 Claims, 2 Drawing Sheets

METHOD AND DEVICE FOR GENERATING PROGRAM INTERRUPTIONS IN USERS OF A BUS SYSTEM, AND BUS SYSTEM

FIELD OF THE INVENTION

The present invention relates to a method and a device for generating at least one program interruption in at least one user of a bus system, and a corresponding bus system.

BACKGROUND INFORMATION

Interconnection of control units, sensors, and actuator devices with the help of a communication system has increased markedly in recent years in the construction of modern motor vehicles and machines, in particular in the area of machine tools and in automation. Synergy effects can be achieved by distributing functions over a plurality of control units. Such configurations are referred to as distributed systems. Communication between different stations is taking place increasingly via a bus. The communication traffic on the bus, access and reception mechanisms and error handling are regulated by a protocol. Bus-specific elements of control units, sensors and actuator devices, referred to below as users, in combination with the communication network, are referred to below as a bus system.

The established protocol in the motor vehicle field is the CAN (Controller Area Network). This is an event-driven protocol; that is, protocol activities such as transmission of a message are initiated by events that originate outside of the communication system. Unambiguous access to the communication system or bus system is resolved through priority-based bit arbitration. This requires assignment of a unique priority to each message. The CAN protocol is very flexible; additional nodes and messages can be added readily, as long as there are still free priorities (message identifiers) available. The collection of all of the messages to be transmitted on the network with priorities and their sender nodes, and possibly reception nodes, are stored in a list known as the communication matrix.

An alternative to event-driven, spontaneous communication is the purely time-controlled approach. All communication activities on the bus are strictly periodic. Protocol activities such as transmission of a message are triggered only after the elapse of a time applicable to the entire bus system. Access to the medium is based on the allocation of time ranges in which a transmitter has exclusive transmission rights. The protocol is comparatively inflexible; adding new nodes is only possible when the corresponding time ranges have already been released beforehand. This circumstance forces the order of messages to be set already before start-up. A timetable is therefore created, which must fulfill the requirements of the messages in regard to repetition rate, redundancy, deadlines etc. This is known as the "bus schedule." The positioning of the messages within the transmission periods must be synchronized with the applications that produce the contents of the messages, in order to keep the latencies between application and moment of transmission to a minimum. Failure to perform this synchronization would destroy the advantage of time-controlled transmission (minimal latency jitter when transmitting the message over the bus). Thus, the demands on the planning tools are high.

The approach to time-controlled CAN shown in German Patent Application Nos. DE 100 00 302, DE 100 00 303, DE 100 00 304 and DE 100 00 305, the so-called TTCAN (Time Triggered Controller Area network), satisfies the requirements for time-controlled communication sketched out above, as well as the demands for a certain measure of flexibility. TTCAN meets these demands by structuring the communication round (basic cycle) in exclusive time windows for periodic messages of specific communication participants, and in arbitration time windows for spontaneous messages of multiple communication participants.

A TTCAN network is assumed below as the bus system, although this is not to be understood as restrictive in regard to the present invention. Rather, the present invention explained below may also be employed for additional comparable bus systems.

In the context of a TTCAN network, German Patent Application No. DE 100 00 305 describes a method and a device for exchanging data in messages between at least two bus users which are connected by a bus system, where the messages containing the data are transmitted over the bus system by the users and each message contains an identifier that characterizes the contained data, with each user deciding on the basis of the identifier whether it will receive the message. At the same time, the messages are time-controlled by a first user by having the first user transmit a reference message repeatedly over the bus in at least one specified time interval, and the time interval is subdivided into time windows of specifiable length, with the messages being transmitted in the time windows.

SUMMARY

Within such a bus system, a method and a device is provided which allows a program interruption to be generated in a simple manner in users and thus in control units, sensor devices, and/or actuator devices of a bus system, and the program interruption to be synchronized to the bus system, without making additional demands on the particular processor.

In particular, a method and a device, as well as a bus system, for producing at least one program interruption in at least one user of the bus system in which at least one user stores a specifiable time value in at least one memory, the time value being compared with at least one base value, and if the time value and the base time or time base match, the at least one program interruption being triggered. A time-controlled program interruption, i.e., a so-called interrupt, is thus triggered in an advantageous manner.

In a preferred embodiment, the triggering of the program interruption or interrupt is synchronized to the bus system. That means that a time which is present in the bus system itself is used advantageously as the time base or base time. The bus system here is advantageously a TTCAN network, i.e., a TTCAN system.

Expediently, the base time or time base may be equal to one of the three times or time bases: the local time, the cycle time, or the global time of the bus system. Advantageously, each user has a local time or local time base, with the base time or time base corresponding in each case to the local time of the user. It is also advantageous for the local time of one user to be utilized as the global time for the bus system, with the user functioning as timemaster of the bus system, so to speak, and the base time or time base corresponding to this global time.

It may also be advantageous if messages are transmitted in the bus system by having a reference message of one user transmitted as the cycle time at a specifiable time interval, the time interval being subdivided into time windows of specifiable length in which the messages are transmitted, with the base time corresponding to the cycle time (the bus cycle).

Advantageously, a plurality of time values are stored in one or more memories, with each time value being compared to at least one base time, enabling a plurality of program interruptions to be triggered sequentially or simultaneously.

Expediently, the base time used for comparison with the at least one time value for the bus system is fixedly defined or is changeable; in particular, it is definable from the plurality of different base times.

To signal the program interruption, i.e., interrupt, either a general interrupt signal is generated that is present in the bus system anyway, or a special interrupt signal is advantageously generated to signal the program interruption, so that this interrupt signal enables differentiation between time-controlled program interruption, including program interruption according to the present invention, and non-time-controlled, for example event-driven, program interruption.

The example embodiment of the present invention thus may provide a general method whereby in particular an autonomous TTCAN protocol controller is able to generate a time-controlled interrupt which is synchronized to the network, in particular a TTCAN network, and which is independent of the processor.

Thus, it is possible in networked control units, i.e., in distributed automation systems, in motor vehicles or in other places, for an interrupt to be generated simultaneously in a plurality of nodes of the network in particular users of the bus system, or an interrupt may be generated that is derived only from the timing signal of the communication network, in particular a TTCAN, and not from the timing signal of the processor.

Thus, the example method according to the present invention allows more precise setting of the program interruption point, and also simultaneous interrupts or program interruptions in multiple nodes of the bus system, in particular a TTCAN network. Thus in a network, in particular a TTCAN network or comparable bus system, an interrupt is triggered simultaneously in various nodes and/or users, without a special message needing to be sent for this purpose. It is also possible for an interrupt to be triggered directly in the TTCAN network that is referenced to the global time of the bus system, which is calibrated automatically in the TTCAN Level 2 independently of the processor timing signal.

BRIEF DESCRIPTION OF THE DRAWINGS

The present invention is explained in greater detail below on the basis of the figures.

DESCRIPTION OF EXAMPLE EMBODIMENTS

According to an example embodiment of the present invention, a time value is stored in a memory or register, which value is compared with a time base or base time of an autonomous protocol controller of the bus system, in particular a TTCAN. When the time base reaches the value specified by the time value in the register, the interrupt or program interruption is triggered. The interrupt may be indicated by a general interrupt signal or by a special signal for the time-controlled interrupt.

Figure 1:
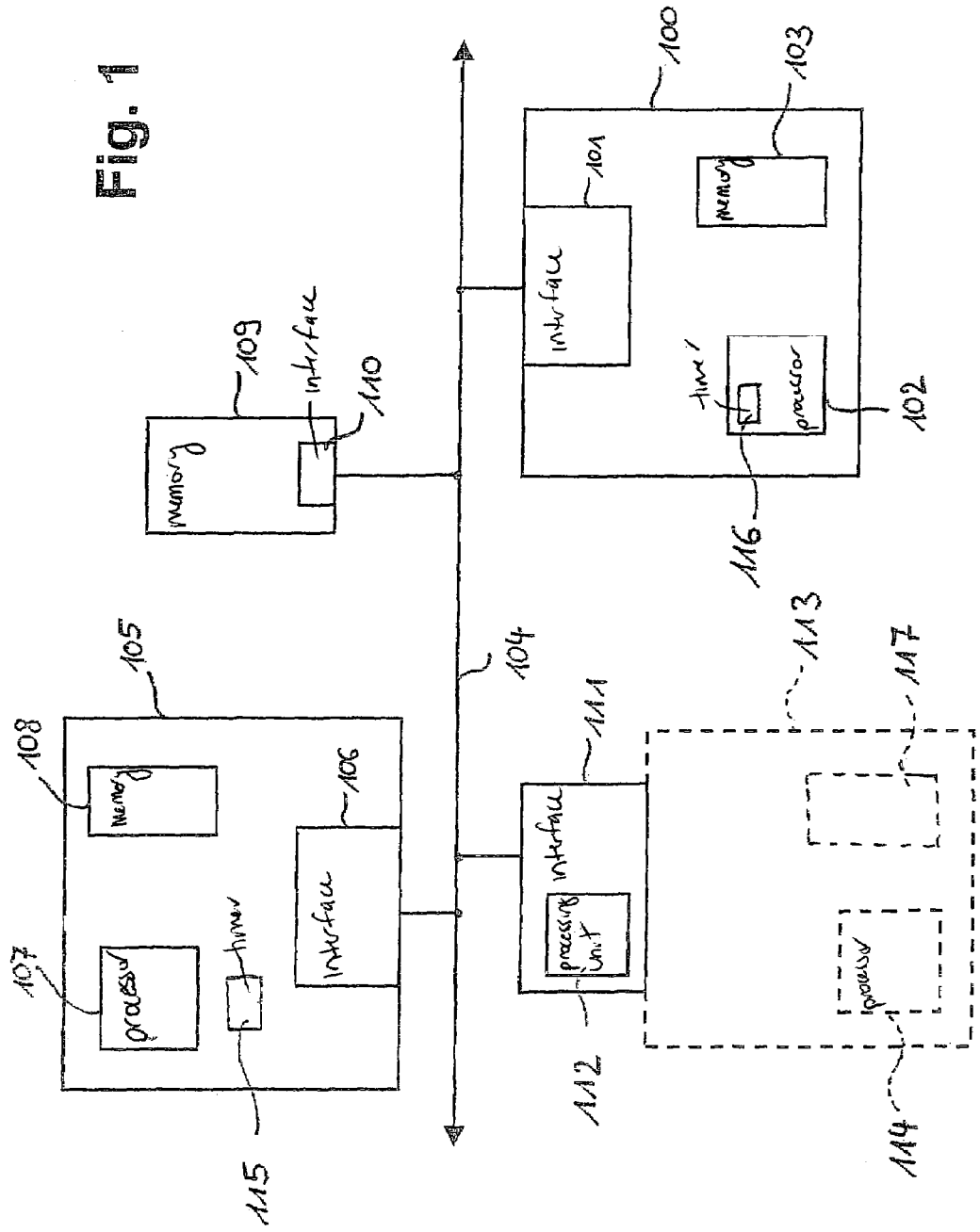
FIG. 1 shows a bus system and its time bases or base times local time, cycle time and global time, as well as various options for storage, in particular using registers.

To this end, FIG. 1 shows a communication network 104 having at least two users 105 and 100. The users here are assumed to be bus-specific modules which are used to connect control units, sensor devices and/or actuator devices to communication network 104 or the bus system. User 100 is connected to the communication network or bus 104 via an interface element 101. User 100 may be a complete control unit, or as mentioned earlier an integrated circuit for coupling to the communication network or bus 104, in particular a protocol controller. Also included in addition to the interface element 101 are for example a processing unit, a processor 102 and a memory unit 103, implemented in particular as a bank of registers. User 105, like user 100, is a simple element in the form of an integrated circuit, in particular a protocol controller in the TTCAN network or a control unit or an arithmetic unit.

Also contained in IC 105 are an interface unit or interface element 106, a processing unit, in particular a processor 107, and a memory 108. The time base or base time of users 100 and 105 is determined by an optionally synchronizable timer. This timer may be a standalone unit in the user itself, like element 115, or may be integrated into the processor, as illustrated by element 116 and processor 102.

Such a timer 115 or 116 thus specifies the local time of the particular bus user 100 or 105. Counters or counter circuits or the like may be used as timers. Such a timer 115 or 116 thus specifies the local time of the particular bus user 100 or 105 as the time master for the bus system. The local time specified by the time master, i.e., the corresponding timer 115, is thus used as the global time for the entire bus system, and is transmitted for example via reference messages to the other bus users, so that the local time of the time master is the global time of all bus users.

In the special example of a TTCAN system, the latter is based generally on a time-controlled periodic communication which is timed by a timer, namely the user having the master time function, using a time reference message or reference message. The period to the next reference message is known as the basic cycle, and includes the cycle time. This basic cycle in turn is subdivided into N time windows (N ∈ ∠), where each time window allows exclusive transmission of a periodic message of varying length. These periodic messages are then transmitted in a TTCAN controller by using time marks which are coupled to the passage of a logical and relative time. However, TTCAN also allows provision for free time windows, with these time windows being used for spontaneous messages in conjunction with arbitration on the bus and the arbitration schema being used according to CAN. Synchronization of the local time of the time master as global time with the particular internal local times of the individual users is thus provided for and efficiently implemented. There are thus three times present in the TTCAN system: the global time, the local time, and the cycle time. Referenced to the level in the TTCAN, there are thus two time bases available for selection at Level 1: the local time and the cycle time. In Level two, the global time is additionally available.

According to the present invention, all three time bases or base times may be utilized for comparison with time values, and hence for triggering program interruptions.

As described above, the example method or device and the corresponding bus system according to the present invention are based on the fact that the at least one time value for triggering a program interruption in a memory, in particular in a register, is copied as a time mark. To that end, the named memories 103 and 108 may be used executably as register banks, or optionally a memory 109 coupled separately to the bus via interface unit 110 may be used as a central storage medium for storing at least one or more time values, in order to compare each of these time values with a base time to trigger an interrupt.

Also optional is an interface element 111 having integrated processing unit 112, which links the communication network, i.e., bus 104, with a control unit 113 having integrated additional processor 114. The functionality of interrupt triggering via time comparison may also be performed in this special case by interface element 111 itself, which stores the time values or time value corresponding to the interrupt or program interruption to be triggered, either in an internal memory of the control unit such as memory 17 or central memory 109, or in a possible memory, not explicitly shown, within the interface.

The memories may have an internal structure such that a plurality of storage areas may be used, or else a register structure such that for example a plurality of registers are utilized in order to place a plurality of time values in storage simultaneously or sequentially and to define the program interruption points in time.

The base time or time base used for comparing each of the individual time values with a base time may be selected for example from one of the three previously named values, the local time, cycle time, or global time for interrupt triggering, or may be fixedly assigned to a particular memory or to register areas and fixedly specified in general for interrupt triggering throughout the entire bus system.

Figure 2:
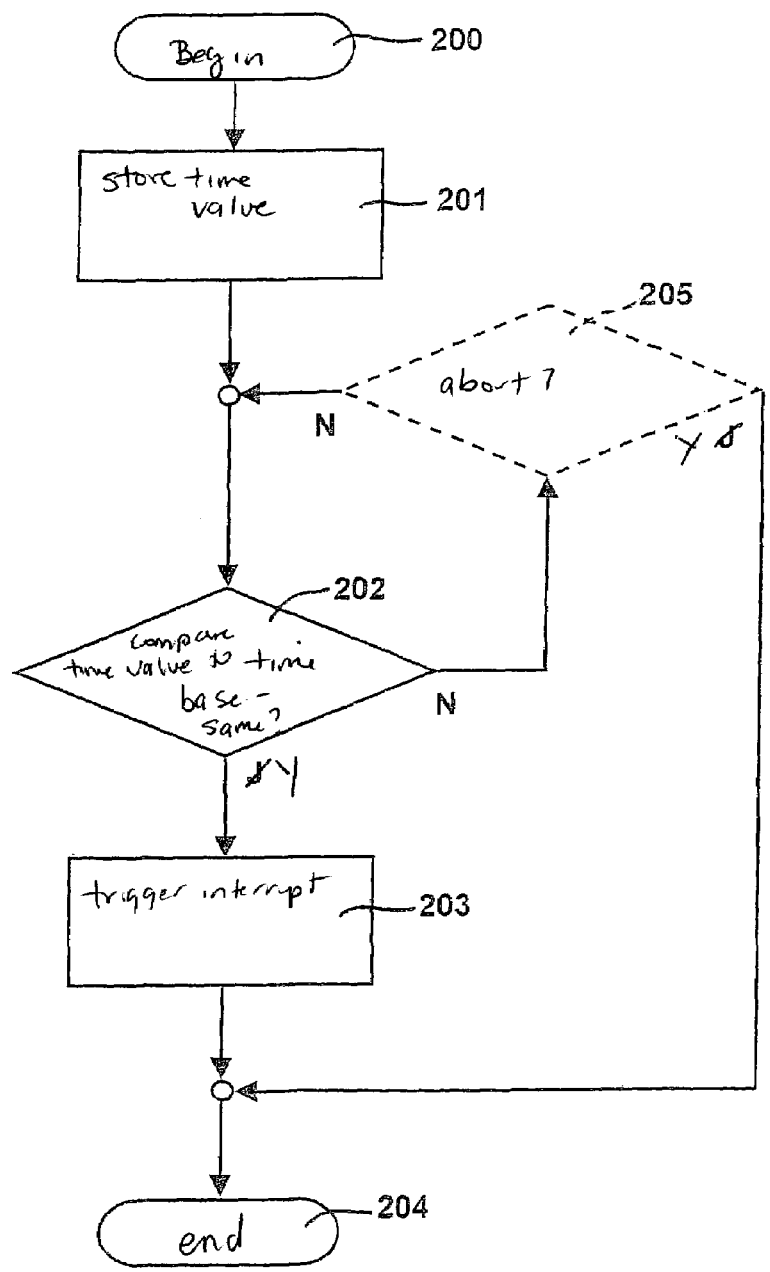
FIG. 2 shows a flow chart illustrating the method for time-controlled generation of a program interruption, including possible variants in the process.

An example procedural sequence up to the triggering of an interrupt will be illustrated once more on the basis of FIG. 2. The process begins in Block 200. In Block 201 the time value for triggering the program interruption is placed in the appropriate memory, and if so provided the corresponding time base for comparison with the time value may be specified or selected. The time value is then compared with the corresponding time base in a query 202. This may be accomplished for example by comparing the time base value with the time value or time mark TM. To select a particular time base, an additional value TMC may be used, which has different values such as 1, 2 or 3 corresponding to cycle time, local time, or global time. In cases where such an indicator is utilized in selecting the particular time base, it may also be employed to permit writing into the time value register, i.e., the time mark register, only when TMC has a particular value such as 0.

If the time base and time value are the same, that is, if the running time base has reached the time value, an interrupt is triggered in Block 203. Triggering of such a time interrupt may be signaled for example by writing an additional value of a time mark interrupt TMI to an interrupt register, in particular to the TT interrupt vector register in TTCAN. Depending on the chosen time base and the scope of the interrupt, it is thus possible to apply a program interruption selectively to individual users, ranging up to all users, that is, to the entire bus system. This also depends in part on an assignment of time value, time base, and interrupt, also representable by a memory assignment. Thus it is possible for example for local storing of a time value in the internal memory of a user to result in a merely local interrupt for that user.

When a central memory such as memory 109 is used, it is necessary to specify an exact assignment of time value, time base, and scope of the interrupt, i.e., which users are subjected to a program interruption and when. Such time mark interrupt values or TMI values may also have consequences for the entire bus system in the case of a TTCAN network. It is possible for example, using a time mark gap value in a TT gap control register, to determine whether the next reference message will be started upon activation of a time mark interrupt, i.e., the writing of a TMI value, or whether the TMI information is reset automatically with each reference message.

After the triggering of the interrupt in Block 203 and the sequences just described, Block 204, i.e., the end of the process, is reached. However, if it is found from the comparison in Block 202 that the time value and time base have not yet reached the same value, i.e., that the time base has not yet reached the time value, it is possible to query this comparison further, or optionally to insert an abort condition 205 in order to prevent the system from hanging. With the help of such an abort condition it is then possible, in particular in the event of an error, to circumvent the comparison and to attain the end of the process directly without triggering an interrupt; this may then also be followed by a specific error response or error handling procedure.

Individual interrupt signals may be indicated individually or in combination. This creates a simple procedure for regenerating program interruptions, which makes possible a time-controlled program interruption without placing any demand on the processor, independently of the processor timing and synchronously with the bus system.

What is claimed is:

1. A method for generating at least one program interruption in at least one user of a bus system, comprising:
    storing, by at least one user, a predetermined time value in at least one memory;
    comparing the time value with at least one progressing base time; and
    when the time value is reached by the progressing base time, triggering the at least one program interruption, the progressing base time corresponding to a time valid for the entire bus system, so that the time value determines a defined program interruption point.

2. The method as recited in claim 1, wherein the bus system is a TTCAN system.

3. The method as recited in claim 1, wherein each user has a local time and the base time corresponds in each case to the local time of the user.

4. The method as recited in claim 1, wherein the local time of one user is utilized as a global time for the bus system, and the base time corresponds to the global time.

5. The method as recited in claim 1, further comprising:
    transmitting messages in the bus system by having a reference message of a user transmitted in a specifiable time interval as cycle time, the time interval being subdivided into time windows of specifiable length in which the messages are transmitted, the base time corresponding to the cycle time.

6. The method as recited in claim 1, further comprising:
    storing a plurality of time values in one or more memories, each of the plurality time values being compared with at least one base time, which enables a plurality of program interruptions to be triggered sequentially or simultaneously.

7. The method as recited in claim 1, wherein the base time for comparison with the at least one time value for the bus system is fixedly defined or is changeable.

8. The method according to claim 7, wherein the base time is definable from a plurality of different base times.

9. The method as recited in claim 1, further comprising:
    generating a general interrupt signal of the bus system to indicate the program interruption.

10. The method as recited in claim 1, further comprising:
generating a special interrupt signal in the bus system to indicate the program interrupter, which enables differentiation between time-controlled program interruption and non-time-controlled program interruption.

11. The method as recited in claim 10, wherein the non-time-controlled program interruption is an event-driven interruption.

12. A device for generating at least one program interruption in at least one user of a bus system, comprising:
at least one memory storing a predetermined time value; and
a comparator which compares the time value with at least one progressing base time, and when the time value is reached by the progressing base time, triggers the at least one program interruption, the progressing base time corresponding to a time valid for the entire bus system, so that the time value determines a defined program interruption point.

13. The device as recited in claim 12, wherein the device is an integrated circuit.

14. A bus system, comprising:
at least two users, at least one of the users including a device for generating at least one program interruption, the device including at least one memory storing a predetermined time value, and a comparator configured to compare the time value with at least one progressing base time, and when the time value is reached by the progressing base time, triggers the at least one program interruption, the progressing base time corresponding to a time valid for the entire bus system, so that the time value determines a defined program interruption point.

* * * * *